United States Patent
Kim

(10) Patent No.: US 8,125,477 B2
(45) Date of Patent: Feb. 28, 2012

(54) PLASMA DISPLAY AND DRIVING METHOD THEREOF

(75) Inventor: Jong-Wook Kim, Suwon-si (KR)

(73) Assignee: Samsung SDI Co., Ltd., Gongse-dong, Giheung-gu, Yongin-si, Gyeonggi-do (KR)

(*) Notice: Subject to any disclaimer, the term of this patent is extended or adjusted under 35 U.S.C. 154(b) by 848 days.

(21) Appl. No.: 12/219,618

(22) Filed: Jul. 24, 2008

(65) Prior Publication Data
US 2009/0040208 A1 Feb. 12, 2009

(30) Foreign Application Priority Data
Aug. 7, 2007 (KR) .................. 10-2007-0079031

(51) Int. Cl.
*G09G 5/00* (2006.01)

(52) U.S. Cl. ...................................... 345/211; 345/212

(58) Field of Classification Search .............. 345/60–69, 345/204–215
See application file for complete search history.

(56) References Cited

U.S. PATENT DOCUMENTS

| | | | | |
|---|---|---|---|---|
| 7,710,366 B2* | 5/2010 | Lee et al. | | 345/82 |
| 2005/0225504 A1* | 10/2005 | Kim | | 345/60 |
| 2005/0259051 A1* | 11/2005 | Lee et al. | | 345/76 |
| 2007/0035481 A1* | 2/2007 | Kim | | 345/68 |

FOREIGN PATENT DOCUMENTS

| | | |
|---|---|---|
| KR | 10-2004002968 | 4/2004 |
| KR | 10-2005003622 | 4/2005 |
| KR | 10-2005012205 | 12/2005 |
| KR | 10-0586605 | 5/2006 |

* cited by examiner

*Primary Examiner* — Vijay Shankar
(74) *Attorney, Agent, or Firm* — Robert E. Bushnell, Esq.

(57) ABSTRACT

In a plasma display, a drain of a first transistor is connected to a scan electrode, and a source of the first transistor is connected to a power source supplying a first voltage. First and the second resistors are connected in series with the scan electrode and the power source. A scan electrode driver turns on the first transistor during a reset period to decrease a voltage of the scan electrode. A scan electrode driver senses the voltage of the electrode from a voltage divided by first and second resistors connected in series between the electrode and the power source. Upon the voltage of the scan electrode becoming a second voltage which is higher than the first voltage, the scan electrode driver turns off the first transistor to maintain the voltage of the scan electrode at the second voltage. In an address period, a scan electrode driver supplies the first voltage to the scan electrode of a light emitting cell. At least one resistor of the first and second resistors is a variable resistor in which resistance varies as the temperature of the Plasma Display Panel (PDP) varies, such that the plasma display can perform steady operation.

20 Claims, 5 Drawing Sheets

PLASMA DISPLAY AND DRIVING METHOD THEREOF

CLAIM OF PRIORITY

This application makes reference to, incorporates the same herein, and claims all benefits accruing under 35 U.S.C. §119 from an application for PLASMA DISPLAY AND DRIVING METHOD THEREOF earlier filed in the Korean Intellectual Property Office on the 7 Aug., 2007 and there duly assigned Serial No. 10-2007-0079031.

BACKGROUND OF THE INVENTION

1. Field of the Invention

The present invention relates to a plasma display and its driving method.

2. Description of the Related Art

A plasma display includes a Plasma Display Panel (PDP) for displaying characters or images using a plasma generated by a gas discharge. In the PDP, a plurality of discharge cells are arranged in a matrix form.

In general, in the plasma display, one frame is divided into a plurality of subfields and driven, and gray scales are represented by a combination of weighted values of subfields. Light emitting cells and non-light emitting cells are selected by an address discharge during an address period of each subfield, and an image is actually displayed by a sustain discharge performed in the light emitting cells during a sustain period.

Such a discharge occurs only when a voltage difference between two electrodes is set higher than a predetermined voltage. The voltage levels used for each electrode in the address period and sustain period are different. Furthermore, a plasma display has a characteristic in which discharge characteristics are varied depending on temperature. Thus, the voltage level used for each electrode should vary depending on temperature to generate a steady discharge even if the temperature varies. Accordingly, the number of power sources supplying each voltage is increased.

SUMMARY OF THE INVENTION

The present invention has been made in an effort to provide a plasma display and its driving method having a reduced number of power sources.

In addition, the present invention has been made in an effort to provide a plasma display and its driving method which generate a normal discharge when the temperature varies.

A plasma display according to one exemplary embodiment of the present invention includes: a Plasma Display Panel (PDP) including an electrode; a first transistor connected between the electrode and a power source for supplying a first voltage; a first driver for changing a voltage of the electrode by controlling driving of the first transistor; first and a second resistors connected in series between the electrode and the power source; and a second transistor to turn on in response to a voltage of a junction of the first and second resistors, an to turn off the first transistor in response to the voltage of the electrode becoming a second voltage different from the first voltage during a first period.

At least one of the first and second resistors is a variable resistor with a resistance that varies with temperature of the PDP.

Another embodiment of the present invention provides a method of driving a plasma display including an electrode. The driving method includes: turning on a first transistor connected between the electrode and a power source supplying a first voltage to vary a voltage of the electrode during a first period; sensing the voltage of the electrode from a voltage divided by a plurality of resistors connected in series between the electrode and the power source; opening a path between the electrode and the power source in response to the voltage of the electrode varying to a second voltage different from the first voltage, and maintaining the voltage of the electrode at the second voltage; and supplying the first voltage to the first electrode during a third period. At least one resistor from among the plurality of resistors is a variable resistor with a resistance that varies according to the temperature of the plasma display.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1:
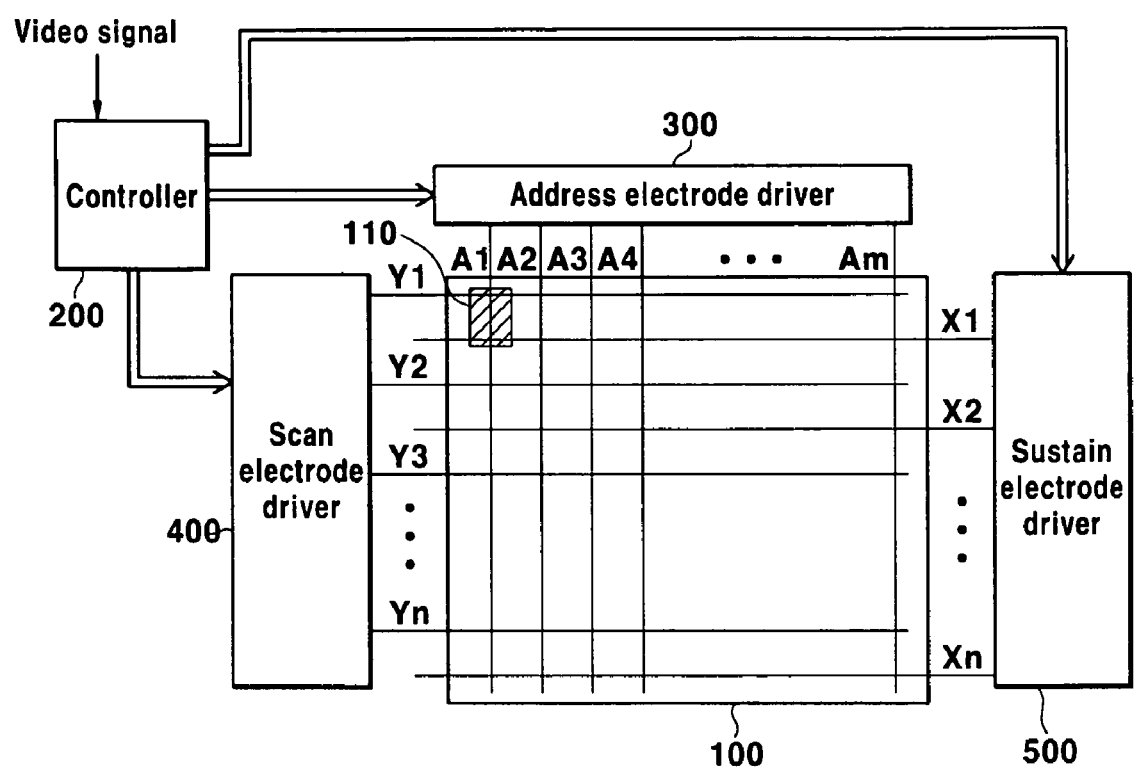
FIG. 1 is a block diagram of a plasma display according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification. Throughout this specification and the claims that follow, when it is described that an element is "coupled" to another element, the element may be "directly coupled" to the other element or "coupled" to the other element through a third element.

When it is described in the specification that a voltage is maintained, it should not be understood to strictly imply that the voltage is maintained exactly at a predetermined voltage. To the contrary, even if a voltage difference between two points varies, the voltage difference is expressed to be maintained at a predetermined voltage in the case that the variance is within a range allowed in design constraints or in the case that the variance is caused due to a parasitic component that is usually disregarded by a person of ordinary skill in the art. In addition, compared with a discharge voltage, a threshold voltage of a semiconductor element (transistor, diode, etc.) is very low, so the threshold voltage is regarded as 0V and approximately processed. Thus, voltages supplied to a node or an electrode by a power source includes voltages that are varied due to a threshold voltage or a parasitic component, etc., from a voltage of the power source voltage.

A plasma display and its driving method according to an exemplary embodiment of the present invention is described in detail as follows.

FIG. 1 is a block diagram of a plasma display according to an exemplary embodiment of the present invention.

As shown in FIG. 1, a plasma display according to an exemplary embodiment of the present invention includes a PDP 100, a controller 200, an address electrode driver 300, a scan electrode driver 400, and a sustain electrode driver 500.

The PDP 100 includes a plurality of address electrodes A1-Am (referred to as "A electrodes" hereinafter) extending in a column direction, and a plurality of sustain electrodes X1~Xn (referred to as "X electrodes" hereinafter) and a plurality of scan electrodes Y1~Yn (referred to as "Y electrodes" hereinafter) extending in a row direction, making pairs. In general, the X electrodes X1~Xn are formed to correspond to the respective Y electrodes Y1~Yn, and the X electrodes X1~Xn and the Y electrodes Y1~Yn perform a display operation during a sustain period in order to display an image. The Y electrodes Y1~Yn and the X electrodes X1~Xn are disposed to cross the A electrodes A1~Am. Discharge spaces present at each crossing of the A electrodes A1~Am and the X and Y electrodes X1~Xn and Y1~Yn form cells 110. The structure of the PDP 100 is merely one example, and a panel with a different structure to which driving waveforms described hereinbelow can be supplied can also be applicable to the present invention.

The controller 200 receives an externally supplied video signal and outputs an A electrode driving control signal, an X electrode driving control signal, and a Y electrode driving control signal. The controller 200 drives a single frame by dividing it into a plurality of subfields.

The address electrode driver 300 receives the A electrode driving control signal from the controller 200 and supplies a driving voltage to the A electrodes.

The scan electrode driver 400 receives the Y electrode driving control signal from the controller 200 and supplies a driving voltage to the Y electrodes.

The sustain electrode driver 500 receives the X electrode driving control signal from the controller 200 and supplies a driving voltage to the X electrodes.

Figure 2:
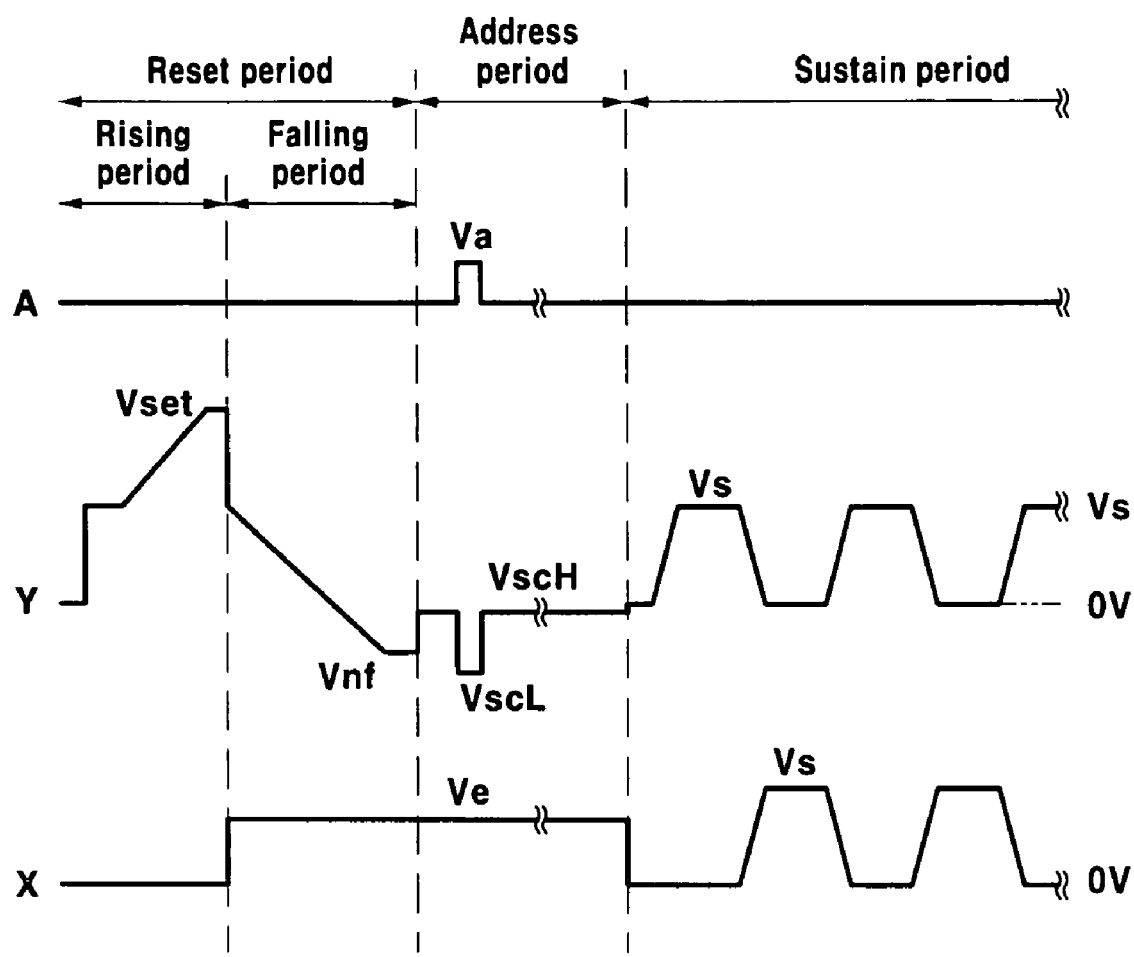
FIG. 2 includes views of driving waveforms of the plasma display according to the exemplary embodiment of the present invention.

FIG. 2 includes views of driving waveforms of the plasma display according to the exemplary embodiment of the present invention. FIG. 2 shows only driving waveforms of one of a plurality of subfields constituting a single frame, namely, driving waveforms supplied to the X, Y, and A electrodes that form a single discharge cell, for better understanding and ease of description.

As shown in FIG. 2, during a rising period of the reset period, the address electrode driver 300 and the sustain electrode driver 500 respectively bias the A and X electrodes to a reference voltage (0V in FIG. 2), and the scan electrode driver 400 gradually increases the voltage of the Y electrodes from a voltage Vs to a voltage Vset. In FIG. 2, the voltage of the Y electrodes is shown to increase in a ramp pattern. Then, while the voltage of the Y electrodes is increasing, a weak discharge occurs between the Y and X electrodes and between Y and A electrodes, forming negative (−) wall charges in the Y electrodes and positive (+) wall charges in the X and A electrodes.

During a falling period of the reset period, the sustain electrode driver 500 biases the X electrodes to a voltage Ve and the scan electrode driver 400 gradually decreases the voltage of the Y electrodes from the voltage Vs to a voltage Vnf. In FIG. 2, the voltage of the Y electrodes is shown to be decreased in the ramp pattern. Then, while the voltage of the Y electrodes is decreasing, a weak discharge occurs between the Y and X electrodes and between the Y and A electrodes, erasing the negative (−) wall charges formed in the Y electrodes and the positive (+) wall charges formed in the X and A electrodes. In general, a voltage (Vnf-Ve) is set to be close to a discharge firing voltage between the Y and X electrodes. Then, a wall voltage between the Y and X electrodes reaches near 0V, and therefore, a cell that was not addressed with an address discharge during the address period is prevented from misfiring during the sustain period.

In an address period, in order to select a light emitting cell, the sustain electrode driver 500 maintains the voltage of the X electrode at the Ve voltage, and the scan electrode driver 400 and the address electrode driver 300 respectively supply a scan pulse having the VscL voltage and an address pulse having the Va voltage to the Y electrode and the A electrode. Then, an address discharge is generated in a cell to which the scan pulse and the address pulse have been supplied, and (+) wall charges are formed in the Y electrode and (−) wall charges are formed in the A electrode and the X electrode, whereby the cell is set to a light emitting cell. Furthermore, the scan electrode driver 400 biases an unselected Y electrode with a VscH voltage higher than a VscL voltage, and the address electrode driver 300 biases an A electrode of a non-light emitting cell to a ground voltage.

In more detail, during the address period, the scan electrode driver 400 and the address electrode driver 300 supply scan pulses to the Y electrode (Y1 in FIG. 1) of a first row and at the same time supply address pulses to the A electrodes positioned at light emitting cells in the first row. Then, address discharges occur between the Y electrodes of the first row and the A electrodes to which the address pulses have been supplied, forming a positive (+) wall charge in the Y electrode, and negative (−) wall charges in the A and X electrodes. Subsequently, while supplying scan pulses to the Y electrodes (Y2 in FIG. 1) of a second row, the scan electrode driver 400 and the address electrode driver 300 supply address pulses to the A electrodes positioned at light emitting cells of the second row. Then, address discharges occur at cells formed by the A electrodes to which the address pulses have been supplied and the Y electrodes of the second row, forming wall charges in the cells. Likewise, by sequentially supplying scan pulses to the Y electrodes of the other remaining rows, the scan electrode driver 400 and the address electrode driver 300 supply address pulses to the A electrodes positioned at light emitting cells to form wall charges.

In general, when the voltage Vnf is supplied during the reset period, the sum of a wall voltage between the A and Y electrodes and the external voltage between the A and Y electrodes is determined by the discharge firing voltage between the A and Y electrodes. When 0V is supplied to the A electrodes and the voltage VscL (=Vnf) voltage is supplied to the Y electrodes, the discharge firing voltage between the A and Y electrodes is formed between the A and Y electrodes and a discharge can occur, but in this case, because a discharge delay time is longer than the width of the scan pulse and the address pulse, no discharge occurs. When the voltage Va is supplied to the A electrodes and the voltage VscL (=Vnf) is supplied to the Y electrodes, a voltage that is higher than the discharge firing voltage between the A and Y electrodes is formed between the A and Y electrodes, reducing the discharge delay time to be smaller than the width of the scan pulse, so a discharge can occur. If the voltage VscL is set to be lower than the voltage Vnf, a voltage difference (VscL−Va) between the Y and A electrodes would increase to make an address occur desirably. In addition, the voltage Va can be lowered as much as the voltage difference VscL−Vnf. Thus, generally, during the address period, the voltage VscL is set to have a level equal to or lower than the voltage Vnf and the voltage Va is set to have a level higher than a reference voltage.

Because the Y electrodes have a relatively high wall voltage over the X electrodes in the cells where the address discharges have occurred during the address period, namely, in the light emitting cells, the scan electrode driver 400 and the sustain electrode driver 500 supply sustain discharge pulses having the voltage Vs to the Y electrodes and a ground voltage to the X electrodes to cause sustain discharges between the Y and X electrodes. As a result, negative (−) wall charges are formed in the Y electrodes and positive (+) wall charges are formed in the X electrodes, so the Y electrodes have a relatively high voltage over the X electrodes.

Subsequently, the scan electrode driver 400 and the sustain electrode driver 500 supply the ground voltage to the Y electrodes and sustain discharge pulses having the voltage Vs to the X electrodes to cause sustain discharges between the Y and X electrodes. As a result, positive (+) wall charges are formed in the Y electrodes and negative (−) wall charges are formed in the X electrodes, to generate sustain discharges when sustain discharge pulses having the voltage Vs are supplied to the Y electrodes. Thereafter, the process of supplying the sustain discharge pulses having the voltage Vs to the Y electrodes and the process of supplying the sustain discharge pulses having the voltage Vs to the X electrodes are repeatedly performed a number of times equal to a weight value indicated by corresponding subfields.

In FIG. 2, the sustain discharge pulses of a voltage Vs are alternately supplied to the Y and X electrodes. But alternatively, sustain discharge pulses alternately of a voltage Vs and a voltage −Vs as a voltage difference of the Y and X electrodes can be supplied to the Y electrodes and/or X electrodes. For example, when the X electrodes are biased to the ground voltage, sustain discharge pulses of a voltage Vs and a voltage −Vs can be supplied to the Y electrodes.

Also, in FIG. 2, after cells are initialized to non-light emitting cells by erasing the wall charges in the cells during the reset period, cells are set as light emitting cells through the address discharges during the address period. But alternatively, after setting the cells to light emitting cells by writing the wall charges in the cells in the rest period or after the sustain period of the previous subfields, the cells can be set as non-light emitting cells through the address discharges during the address period.

Figure 3:
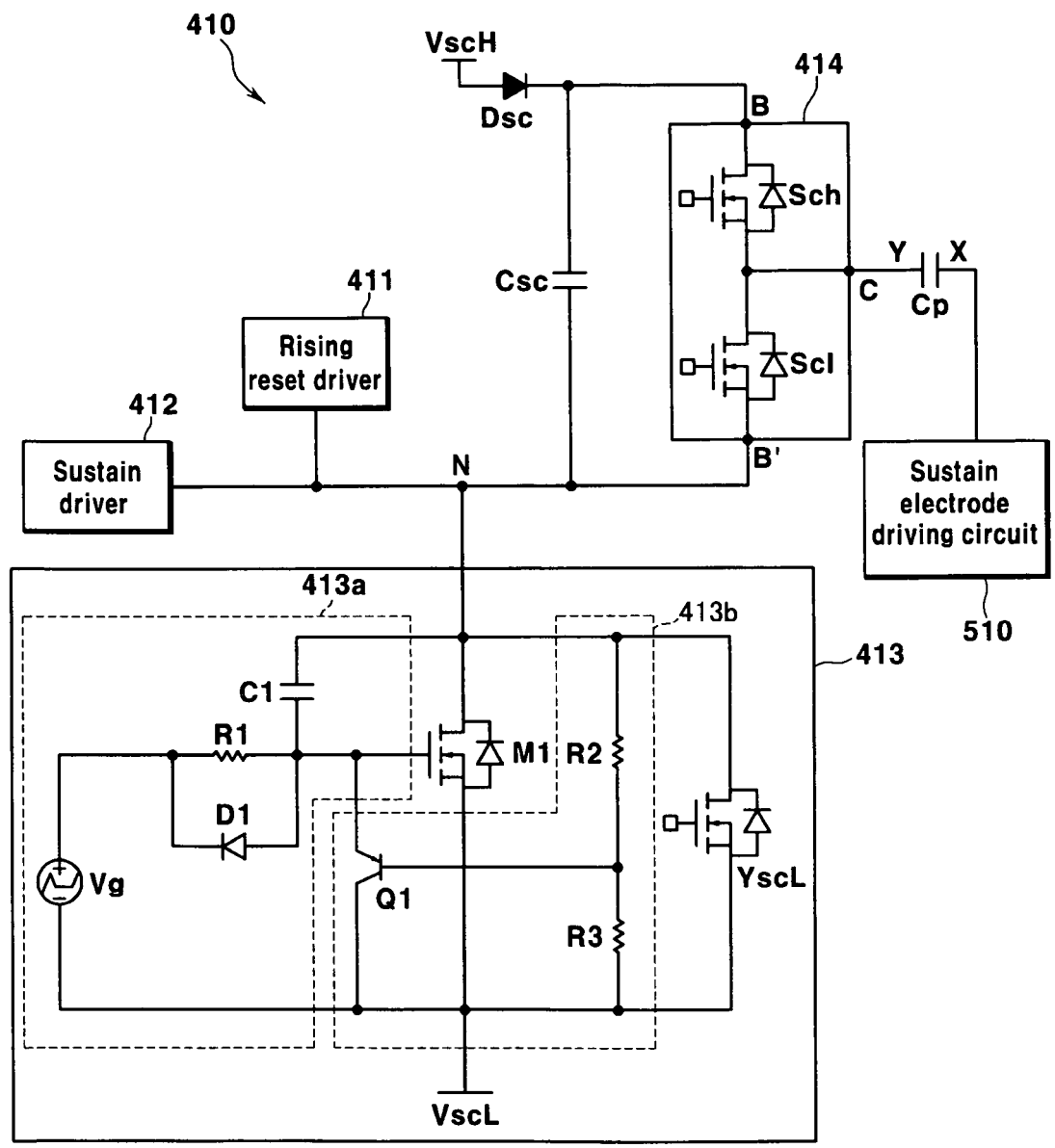
FIG. 3 to FIG. 5 are respective circuit diagrams of a scan electrode driving circuit according to first to third exemplary embodiments of the present invention.
Figure 4:
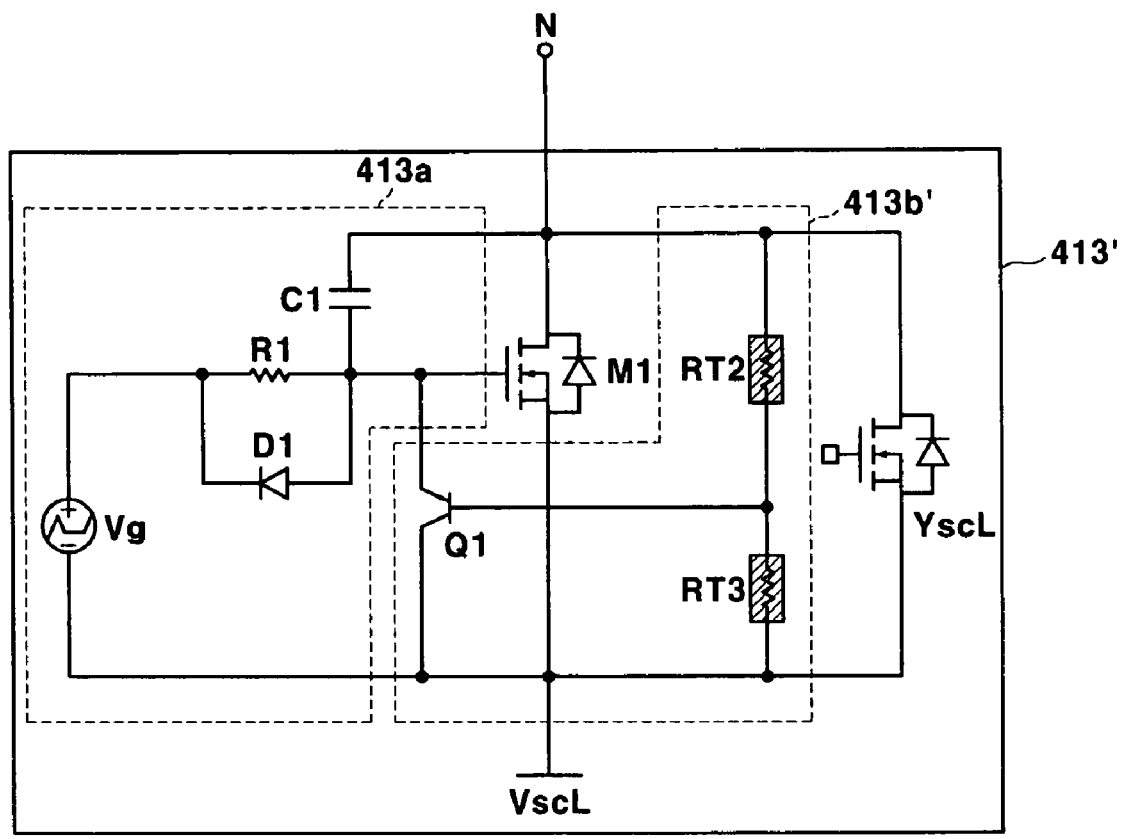
Figure 5:
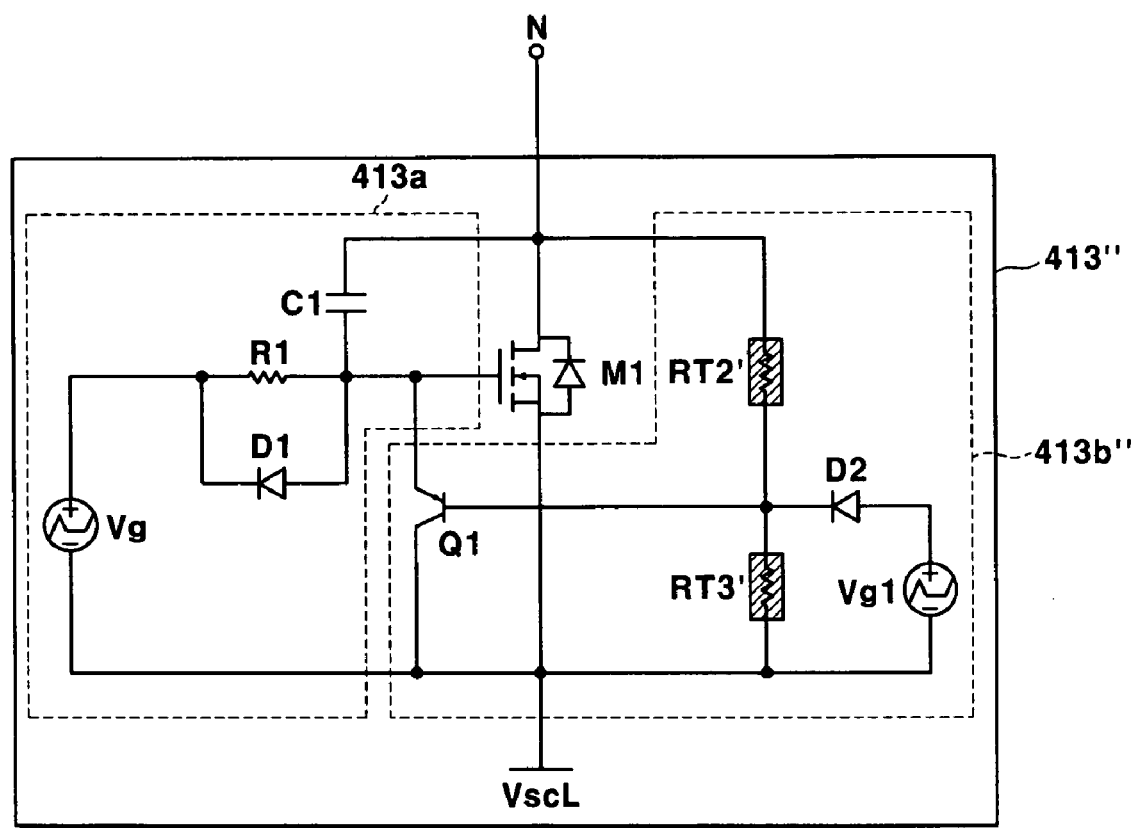

A driving circuit for implementing different levels of voltages with a single power source is described in detail below with reference to FIGS. 3 to 5. In FIGS. 3 to 5, the voltage Vnf is supplied to the Y electrodes during the reset period and the voltage VscL is supplied to the Y electrodes during the address period.

FIG. 3 is circuit diagram of a scan electrode driving circuit according to the first exemplary embodiment of the present invention. A scan electrode driving circuit 410 can be formed in the scan electrode driver 400, and a sustain electrode driving circuit 510 connected to the X electrodes can be formed in the sustain electrode driver 500. For better understanding and ease of description, only a single Y electrode Y1 is shown, and a capacitive component formed by the single Y electrode and a single X electrode is shown as a panel capacitor Cp.

As shown in FIG. 3, the scan driving circuit 410 according to the exemplary embodiment of the present invention includes a rising reset driver 411, a sustain driver 412, a falling reset/scan driver 413, a scan circuit 414, a capacitor Csc, and a diode Dsc.

First, the scan circuit 414 includes first and second input terminals B and B', and an output terminal C connected to the Y electrode, and selectively supplies voltage of the first input terminal B and voltage of the second input terminal B' to the corresponding Y electrode. Although FIG. 3 shows the single scan circuit 414 connected to the Y electrode, the scan circuit 414 is actually connected to the plurality of Y electrodes Y1~Yn. Alternatively, a certain number of scan circuits 414 can be formed as a single scan integrated circuit IC, and a plurality of output terminals of the scan integrated circuit can be connected to a certain number of Y electrodes.

The scan circuit 414 includes transistors Sch and Scl. A source of the transistor Sch and a drain of the transistor Scl are connected to the Y electrode of the panel capacitor Cp. A drain of the transistor Sch is connected to the first input terminal A, a power source VscH for supplying a voltage VscH is connected to the first input terminal A, and a cathode of the diode Dsc whose anode is connected to the power source VscH is connected to the second input terminal B'. A source of the transistor Scl is connected to the second input terminal B, and the second input terminal B' is connected to a node N. A capacitor Csc is connected between the first and second input terminals B and B'.

The falling reset/scan driver 413 is connected to the node N and includes transistors M1 and YscL and drivers 413a and 413b. The driver 413a includes a capacitor C1, a resistor R1, a diode D1, and a control signal voltage source Vg, and the driver 413b includes a transistor Q1 and resistors R2 and R3. In FIG. 3, the transistors M1, YscL, Sch, and Scl are illustrated as N-channel Field Effect Transistors (FETs), particularly N-channel Metal Oxide Semiconductor (NMOS) transistors, and the transistor Q1 is illustrated as a PNP transistor. However, rather than using the NMOS transistors, other transistors that can perform a similar function may be used for the transistors M1, YscL, Sch, Scl, and Q1.

A power source VscL for supplying a voltage VscL is connected to a source of the transistor M1 whose drain is connected to the node N. A second terminal of the capacitor C1 whose first terminal is connected to the drain of the transistor M1 is connected to a gate, a control terminal, of the transistor M1. One end of the resistor R1 and an anode of the diode D1 are connected to the second terminal of the capacitor C1, and a cathode of the diode D1 is connected to the other end of the resistor R1. In addition, the control signal voltage source Vg is connected between the other end of the resistor R1 and the power source VscL. The transistor M1 is driven by the driver 413a to decrease the voltage of the Y electrode in the ramp pattern.

The two resistors R2 and R3 are connected in series between the drain of the transistor M1 and the power source VscL, and a junction of the two resistors R2 and R3 is connected to a base, (i.e.—a control terminal), of the transistor Q1. A collector of the transistor Q1 is connected to the power source VscL, and an emitter of the transistor Q1 is connected to the gate of the transistor M1. When voltage of the Y electrode reaches a certain level, the driver 413b turns the transistor Q1 on to open a path between the transistor M1 and the power source VscL.

A drain of the transistor YscL is connected to the node N, and a source of the transistor YscL is connected to the power source VscL. The transistor YscL is turned on during the address period and provides the voltage VscL to the second input terminal B' of the scan circuit 414.

The sustain driver 412 is connected to the node N and supplies the sustain discharge pulses to the Y electrodes through the second input terminal B' of the scan circuit 414.

The rising reset driver 411 is connected to the node N and supplies rising reset waveforms to the Y electrodes through the second input terminal B' of the scan circuit 414 during the rising period of the reset period.

The operation of the falling reset/scan driver 413 of FIG. 3 is described in detail below.

First, during the reset period, the transistor Scl of the scan circuit 414 is always turned on. In such a condition, during the falling period of the reset period, a high level signal H is output from the control signal voltage source Vg. Then, the voltage of the Y electrode is gradually decreased. In more detail, as the high level signal H is output from the control signal voltage source Vg, a gate voltage of the transistor M1 is increased by a capacitance component formed by the capacitor C1 and a parasitic capacitance of the transistor M1, and a path formed by the resistor R1. Then, the transistor M1 is turned on, so that the voltage of the Y electrode is decreased through the path of the panel capacitor Cp, the transistor M1, and the power source VscL. As the voltage of the Y electrode is decreased, the gate voltage of the transistor M1 is decreased by the capacitor C1 and thus, the transistor M1 is turned off.

When the transistor M1 is turned off, charges accumulated in the panel capacitor Cp move to the capacitor C1, and accordingly, the gate voltage of the transistor M1 increases.

Then, the transistor M1 is turned on again and the voltage of the Y electrode is decreased again.

In this manner, as the transistor M1 is repeatedly turned on and off, the voltage of the Y electrode gradually decreases. When the voltage of the Y electrode, namely, the voltage of the node N is decreased to an arbitrary voltage Vx, the voltage Vx is divided by the two resistors R2 and R3, and a voltage Vb at the base of transistor Q1 is determined by Equation 1 below. The base-collector voltage Vbc becomes lower than a threshold voltage Vth as in Equation 2 below, so that the transistor Q1 is turned on. Accordingly, because a gate-source voltage of the transistor M1 is 0V, the transistor M1 is turned off. That is, the voltage Vx of the node N when the base-collector voltage Vbc of the transistor Q1 is substantially equal to a threshold voltage |Vth| is determined as the voltage Vnf, and the Y electrode can maintain the voltage Vnf during a predetermined period.

$$Vb = VscL + (Vx - VscL)\frac{R3}{(R2 + R3)} \qquad \text{Equation 1}$$

$$Vbc = (Vx - VscL)\frac{R3}{(R2 + R3)} \leq |Vth| \qquad \text{Equation 2}$$

The value |Vnf−VscL| can be varied by controlling resistance values of the resistors R2 and R3.

The transistor YscL is turned on during the address period. Then, the voltage VscL is supplied to the Y electrodes of the cells to be turned on.

In this way, according to the first exemplary embodiment of the present invention, the voltage Vnf and the voltage VscL can be supplied by the single power source VscL.

A plasma display has a characteristic in which discharge characteristics are varied depending on temperature. That is, the discharge firing voltage is greater when the temperature of the PDP 100 becomes higher, and the discharge firing voltage is decreased when the temperature of the PDP 100 becomes lower.

A driving circuit for generating a steady address discharge even if temperature of PDP is varied is described below in detail with reference to reference to FIGS. 4 and 5.

FIG. 4 is a circuit diagram of a scan electrode driving circuit according to a second exemplary embodiment of the present invention.

As shown in FIG. 4, a driver 413b' of the falling reset/scan driver 413' according to the second exemplary embodiment of the present invention includes thermistors RT2 and RT3 instead of resistors R2 and R3.

In general, an address discharge is well generated when the absolute value of a voltage difference between the voltage Vnf and voltage VscL is increased according to an increase in the temperature of the PDP 100. Thus, the thermistor RT2 is a PTC (Positive Temperature Coefficient) thermistor whose resistance increases as the temperature becomes higher. The thermistor RT3 is an NTC (Negative Temperature Coefficient) thermistor whose resistance decreases as the temperature becomes higher. Therefore, a voltage difference between the voltage Vnf and the voltage VscL becomes greater as the temperature of PDP 100 becomes higher, and the voltage difference between the voltage Vnf and the voltage VscL becomes less as the temperature of PDP 100 becomes lower. Thus, an address discharge is easily generated in the address period.

Unlike the second exemplary embodiment of the present invention, a resistor R2 or R3 can be used as a thermistor.

FIG. 5 is a circuit diagram of a scan electrode driving circuit according to a third exemplary embodiment of the present invention.

As shown in FIG. 5, the falling reset/scan driver 413" according to the third exemplary embodiment of the present invention, unlike the second exemplary embodiment, further includes a diode D2 and a control signal voltage source Vg1, and excludes the transistor YscL. A cathode of the diode D2 is connected to one end of each of the two resistors R2 and R3, and the control signal voltage source Vg1 is connected between the anode of the diode D2 and the power source VscL.

During the falling period of the reset period, as the high level signal H is outputted from the control signal voltage source Vg, the operation in which the voltage of the Y electrode is maintained by the voltage Vnf after the voltage of the Y electrode is gradually increased is the same as the first exemplary embodiment of the present.

Meanwhile, during the address period, a high level signal H is outputted from the control signal voltage source Vg1. The base-collector voltage Vbc of the transistor Q1 becomes greater than the threshold voltage Vth, thereby turning off the transistor Q1. Accordingly, the voltage of the Y electrode is gradually decreased to the voltage VscL by turning on and turning off the transistor M1 again.

In this state, the transistor Scl of the scan circuit 414 connected to the Y electrode of the cell to be turned on is turned on, and the voltage VscL can be supplied to the Y electrode of the cell to be turned on. In this way, the falling reset/scan driver 413" according to the third exemplary embodiment of the present invention can supply both the voltage Vnf and the voltage VscL by one power source VscL without the transistor YscL.

According to the present invention, voltages each having a different level can be provided with the single power source, so that the number of power sources of the plasma display can be decreased. Also, even if the temperature varies, the plasma display can perform steady operation.

While the present invention has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

What is claimed is:

1. A plasma display comprising:
   a Plasma Display Panel (PDP) including an electrode;
   a first transistor connected between the electrode and a power source for supplying a first voltage;

a first driver for changing a voltage of the electrode by controlling driving of the first transistor;
first and second resistors connected in series between the electrode and the power source; and
a second transistor turned on in response to a voltage of a junction of the first and second resistors, and the first transistor turned off in response to the voltage of the electrode becoming a second voltage different from the first voltage during a first time period;
wherein at least one of the first and the second resistors is a variable resistor having a resistance that varies in accordance with a temperature of the PDP, wherein, upon the first resistor being the variable resistor, the resistance of the first resistor increases as the temperature of the PDP becomes higher; and wherein, upon the second resistor being the variable resistor, the resistance of the second resistor decreases as the temperature of the PDP becomes higher.

2. The device of claim 1, further comprising a third transistor connected between the electrode and the power source, the third transistor being turned on during a second time period that follows the first time period to supply the first voltage to the electrode.

3. The device of claim 1, further comprising a control signal voltage source to supply a control signal to the control terminal of the first transistor to turn on the first transistor during a falling period of the first time period.

4. The device of claim 2, wherein a reset period comprises the first time period, an address period comprises the second time period, and the first voltage is supplied to the electrode of a cell to be turned on during the address period.

5. The device of claim 3, wherein a reset period comprises the first time period, an address period comprises the second time period, and the first voltage is supplied to the electrode of the cell to be turned on during the address period.

6. The device of claim 2, wherein the first transistor is an N-channel transistor with a first terminal connected to the electrode and a second terminal connected to the power source.

7. The device of claim 3, wherein the first transistor is an N-channel transistor with a first terminal connected to the electrode and a second terminal connected to the power source.

8. The device of claim 2, wherein the first driver controls the first transistor to gradually vary the electrode voltage.

9. The device of claim 3, wherein the first driver controls the first transistor to gradually vary the electrode voltage.

10. A method of driving a plasma display including an electrode, the method comprising:
turning on a first transistor connected between the electrode and a power source to open a path between the electrode and the power source to supply a first voltage to vary a voltage of the electrode during a first time period;
sensing the voltage of the electrode from a voltage divided by a plurality of resistors connected in series between the electrode and the power source;
cutting off the path between the electrode and the power source upon the voltage of the electrode becoming a second voltage that is different from the first voltage;
maintaining the voltage of the electrode at the second voltage during a second time period; and
supplying the first voltage to the first electrode during a third time period;
wherein at least one resistor from among the plurality of resistors is a variable resistor having a resistance that varies according to a temperature of the plasma display.

11. The method of claim 10, wherein the resistance of the at least one resistor is varied in an increasing direction in response to an absolute value of a difference between the first voltage and the second voltage being increased as the temperature of the plasma display becomes higher.

12. The method of claim 11, wherein the first voltage is lower than the second voltage.

13. The method of claim 12, wherein a reset period comprises the first and second time periods, an address period comprises the third time period, and the first voltage is a voltage supplied to the electrode of the cell to be turned on during the address period.

14. The method of claim 12, wherein the maintaining the voltage of the electrode at the second voltage during the second time period comprises turning on a second transistor connected between the control terminal of the first transistor and the power source, the second transistor turning off the first transistor upon the second transistor being turned on.

15. The method of claim 14, wherein the supplying the first voltage to the electrode during the third time period comprises turning on a third transistor that is connected between the electrode and the power source.

16. The method of 14, wherein the cutting off of the path between the electrode and the power source during the second time period comprises supplying a control signal to the control terminal of the first transistor to turn on of the first transistor.

17. The method of claim 10, wherein the sensing the voltage of the electrode from a voltage divided by a plurality of resistors connected in series between the electrode and the power source is achieved by having the voltage divided by the plurality of resistors input to a control terminal of the second transistor.

18. A plasma display, comprising:
a Plasma Display Panel (PDP) including an electrode;
a first transistor connected between the electrode and a power source for supplying a first voltage;
a first driver for changing a voltage of the electrode by controlling driving of the first transistor;
first and second resistors connected in series between the electrode and the power source; and
a second transistor that turns on in response to a voltage at a junction between the first and second resistors by having a control terminal of the second transistor being connected to the junction between the first and second resistors, the second transistor to turn off the first transistor in response to the voltage of the electrode becoming a second voltage that is different from the first voltage during a first time period;
wherein at least one of the first and the second resistors is a variable resistor having a resistance that varies in accordance with a temperature of the PDP.

19. The device of claim 18, wherein the first voltage is lower than the second voltage, the electrode being a scan (Y) electrode.

20. The plasma display of claim 1, the second transistor being connected between a control terminal of the first transistor and the power source.

* * * * *